United States Patent [19]

Kaplan

[11] Patent Number: 4,976,453
[45] Date of Patent: Dec. 11, 1990

[54] TOWING HITCH WITH SHIFTABLE HITCH MEMBER

[75] Inventor: James H. Kaplan, Mission Hills, Kans.

[73] Assignee: Harlan Corporation, Kansas City, Mo.

[21] Appl. No.: 348,514

[22] Filed: May 8, 1989

[51] Int. Cl.$^5$ .............................................. B60D 1/40
[52] U.S. Cl. .................................. 280/479.2; 280/482; 280/491.2
[58] Field of Search ............... 280/477, 482, 484, 488, 280/479.1, 479.3, 478.1, 479.2, 491.2

[56] References Cited

U.S. PATENT DOCUMENTS

| | | | |
|---|---|---|---|
| 2,873,982 | 2/1959 | Graham | 280/482 |
| 3,281,162 | 10/1966 | Carson | 280/479.3 |
| 3,397,900 | 8/1968 | Sturges | 280/478.1 |
| 3,542,398 | 11/1970 | Melroe | 280/477 |
| 3,649,048 | 3/1972 | Garnett | 280/477 |
| 3,807,768 | 4/1974 | Jones | 280/479.3 |
| 4,073,508 | 2/1978 | George et al. | 280/478.1 |
| 4,447,071 | 5/1984 | Kaplan | 280/479.1 |
| 4,575,112 | 3/1986 | Tremblay | 280/479.1 |
| 4,770,436 | 9/1988 | Anderson | 280/479.1 |
| 4,893,829 | 1/1990 | Davis | 280/479.3 |

Primary Examiner—Charles A. Marmor
Assistant Examiner—A. M. Boehler
Attorney, Agent, or Firm—Hovey, Williams, Timmons & Collins

[57] ABSTRACT

The towing hitch for attachment to a towing vehicle is disclosed having a hitch member which is selectively shiftable throughout an area of movement thereby requiring only that the coupling element of a trailer be placed within the movement area in order to couple the trailer with the vehicle. The preferred hitch includes a framework for coupling with the towing vehicle, an elongated hitch member, and a coupling assembly coupling the member with the framework for selective axial and pivotal shifting of the hitch member throughout the movement area.

5 Claims, 3 Drawing Sheets

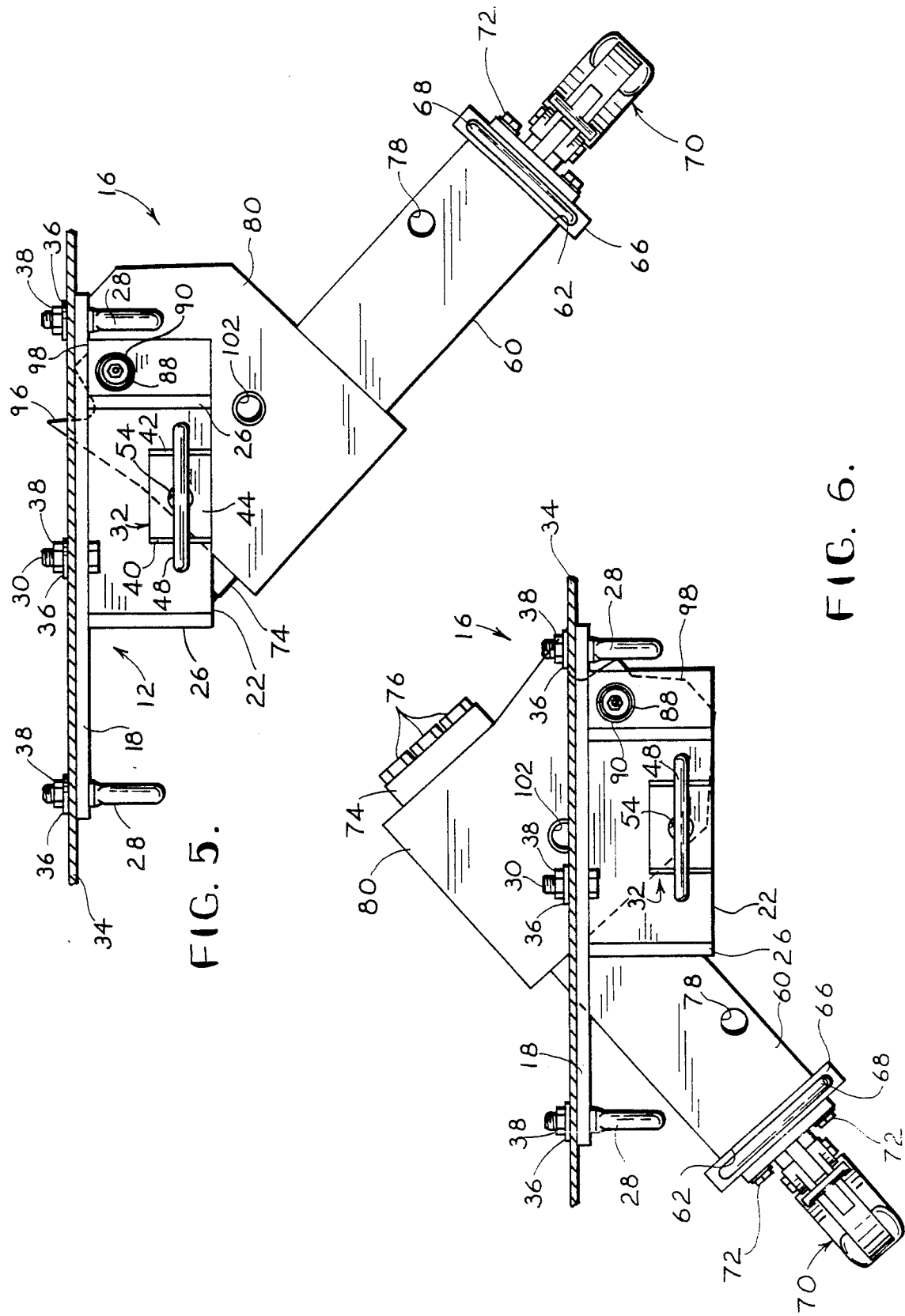

TOWING HITCH WITH SHIFTABLE HITCH MEMBER

BACKGROUND OF THE INVENTION

1. Field of the Invention

The present invention relates to a towing hitch for attachment to a towing vehicle. More particularly, the present invention relates to a towing hitch having a hitch member which is selectively shiftable throughout an area of movement.

2. Description of the Prior Art

Some prior art towing hitches such as that disclosed in U.S. Pat. No. 4,447,071, which is hereby incorporated by reference, provide an elongated latch or hitch member which can be axially extended and retracted. This provides greater convenience in coupling the trailer to the vehicle because the trailer coupling element need only be placed in line with the hitch member and within the range of its extension. This avoids some repositioning of the towing vehicle in order to align the trailer hitch element with the hitch member.

Even with this provision in the prior art, however, a trailer coupling element must be axially aligned with the hitch member. This is true even with a swingable trailer coupling tongue because the arc through which the tongue passes must intersect the extendable axis of the hitch member. If such an alignment is not achieved, the operator must either reposition a towing vehicle or manhandle the trailer in order to reposition it, leading to further inconvenience and potential back injury.

SUMMARY OF THE INVENTION

The present invention solves the prior art problems outlined above. That is to say, the towing hitch hereof only requires that the tongue end of the trailer be within a predetermined coupling area in the vicinity of the towing vehicle hitch.

The preferred towing hitch broadly includes a framework for attachment to the towing vehicle, an elongated hitch member presenting a connecting end adapted for attaching a trailer connector thereto, and a coupling assembly coupling the hitch member to the framework for selective axial and pivotal shifting of the connection end thereby defining a coupling area. The towing vehicle need only be positioned such that the trailer coupling element lies within the coupling area in order to couple the trailer with the vehicle and avoid any need for manhandling the trailer or repositioning the vehicle.

In the preferred embodiment, the hitch member is elongated and axially slidable, and a pivot pin pivotally couples the coupling assembly with the framework thereby allowing the hitch member connection end to be pivoted through an arc. In preferred forms, a locking pin automatically and releasably locks the hitch member in its retracted position and locks the coupling assembly in a center-aligned position.

BRIEF DESCRIPTION OF THE DRAWING FIGURES

FIG. 5 is a top view of the preferred hitch showing the hitch member in the extended position and pivotally shifted rightwardly; and FIG. 6 is a view of the trailer hitch similar to FIG. 5 but showing the hitch member pivotally shifted leftwardly.

DETAILED DESCRIPTION OF THE PREFERRED EMBODIMENT

Figure 2:
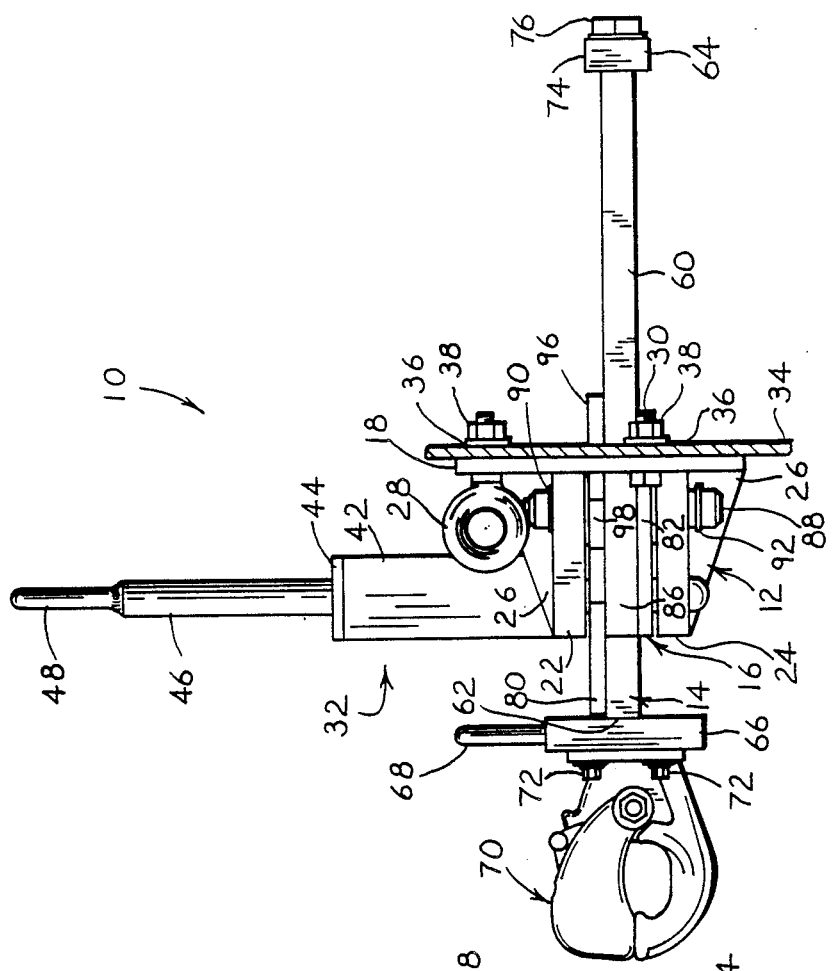
FIG. 2 is a side elevational view of the hitch of FIG. 1 showing the hitch member in the retracted position.

Referring to the drawing figures, the preferred embodiment of towing hitch 10 is constructed of steel and broadly includes framework 12, hitch member 14 and coupling assembly 16.

Framework 12 includes rectangularly shaped backing plate 18 having a rectangularly shaped, centrally disposed movement slot 20 defined therethrough, upper and lower, rectangularly shaped, outwardly extending, support plates 22 and 24, four reinforcing gussets 26, a pair of outwardly extending, safety chain eye bolts 28, three vehicle-frame attachment bolts 30, and locking pin assembly 32.

Figure 1:
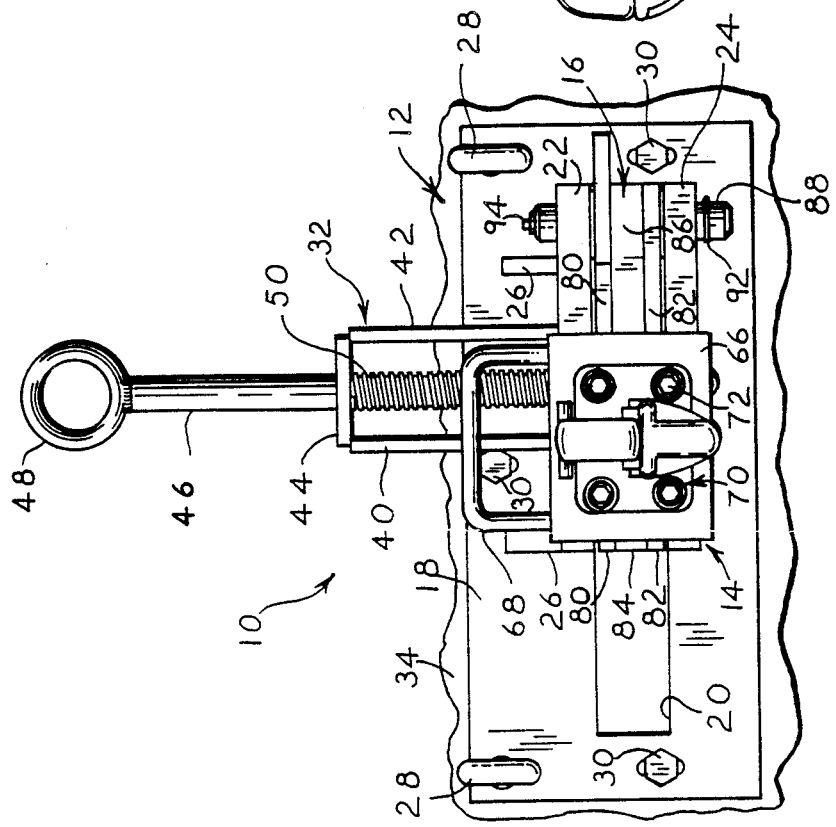
FIG. 1 is an end elevational view of the preferred towing hitch illustrating the hitch coupled with the frame of a towing vehicle.

Upper support plate 22 extends outwardly from the face of backing plate 18 adjacent the upper edge of slot 20 and is offset rightwardly relative thereto as viewed in FIG. 1 such that the rightward edge of upper plate 22 is adjacent the rightward edge of movement slot 20. Lower support plate 24 is similarly welded to plate 18 but adjacent the lower edge of slot 20. Both upper and lower support plates 22,24 are shorter in length than the length of slot 20 thereby exposing a leftward portion of slot 20 as viewed in FIG. 1.

A pair of gussets 26 are respectively welded to each support plate 22,24 and to backing plate 18 in order to securely hold plates 22,24 in their cantilevered positions.

Eye bolts 28 and attachment bolts 30 extend through appropriately defined bolt holes in backing plate 18 and through that portion of the towing vehicle frame 34 to which hitch 10 is attached during use. Bolts 28,30 are respectively secured by washers 36 and nuts 38.

Locking pin assembly 32 includes upstanding support bodies 40,42, pin guide plate 44, cylindrical, elongated, upstanding locking pin 46 having ring-shaped locking pin handle 48 welded to the upper end thereof, helical spring 50, and spring retaining pin 52.

Support bodies 40,42 are spaced apart and welded to the upper face of upper support plate 22 adjacent and perpendicular to the outboard edge thereof as best viewed in FIG. 1. Pin guide plate 44 extends between the upper edges of bodies 40,42 and includes a centrally defined locking pin aperture 54 defined therethrough through which locking pin 46 extends. Upper and lower support plates 22,24 similarly include respective upper and lower locking pin apertures 56,58 aligned with aperture 54 for extension of locking pin 46 therethrough as explained further hereinbelow.

Figures 3, 4:
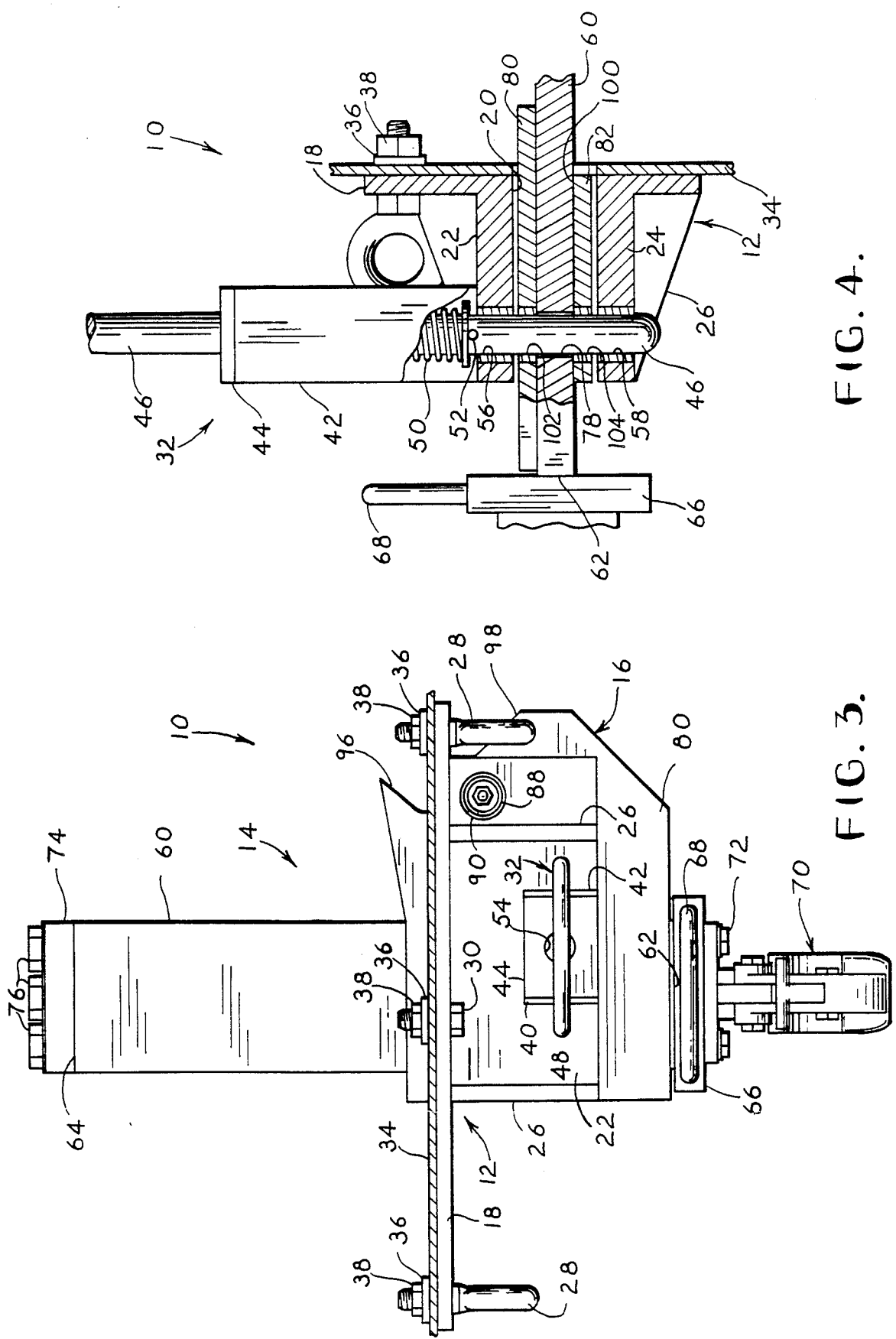
FIG. 3 is a top view of the hitch of FIG. 1.
FIG. 4 is a partial sectional view of the hitch of FIG. 1 with portions cut away for clarity.

Biasing spring 50 extends between the lower face of pin guide plate 44 and retaining pin 52 as best viewed in FIG. 4 for downwardly biasing pin 46. Retaining pin 52 also serves to limit the downward travel of locking pin 46 by abutting the upper face of upper support plate 22 when locking pin 46 is in its locked position as best viewed in FIG. 4.

Hitch member 14 includes elongated hitch body 60 having the configuration of a rectangular solid and presenting connection end 62 and opposed inboard end 64, rectangular connection plate 66 welded transversely to connection end 62, inverted U-shaped extension handle 68 extending upwardly from the upper edge of connection plate 66, conventional trailer connector 70 secured to the outboard face of connection plate 66 by four connection bolts 72, and rectangularly shaped stop plate 74 transversely connected to inboard end 64 by connection bolts 76. Hitch body 60 also includes locking aperture 78 defined therethrough, offset from the axis thereof, and positioned near connection end 62 such that locking aperture 78 aligns with apertures 54–58 when hitch member 14 is in its retracted position.

Coupling assembly 16 includes upper and lower, spaced-apart coupling plates 80 and 82, left and right spacer blocks 84,86, pivot pin 88, upper and lower pin-retaining snap rings 90 and 92, and grease zerk 94.

Upper coupling plate 80 presents, in plan view, a generally rectangular configuration on the leftward side thereof and a somewhat irregular, trapezoidally-shaped configuration on the rightward side thereof as best viewed in FIGS. 3, 5, and 6. This configuration presents left shift stop surface 96 and right shift stop surface 98 at right angles to one another, the purposes of which are explained further hereinbelow.

Lower coupling plate 82 presents a rectangular configuration congruent with upper and lower support plates 22,24. Lower coupling plate 82 is spaced from upper coupling plate 80 by left and right spacer blocks 84,86 which define hitch member passage 100 therebetween which is centrally aligned with slot 20 for guiding, aligning and supporting axial movement of hitch member 14 therein. Upper and lower coupling plates 80,82 also present mutually aligned, upper and lower locking holes 102 and 104 which, when coupling assembly 16 is in its aligned position as shown in FIGS. 1–4, are also aligned with apertures 54–58 and allow passage of locking pin 46 therethrough in order to lock coupling assembly 16 in its centrally aligned position.

Pivot pin 88 extends through appropriately defined apertures defined in upper and lower coupling plates 80,82 and right spacer block 86 adjacent the upper right portions thereof as viewed in FIG. 3. Upper and lower retainer rings 90,92 extend about pin 88 respectively adjacent upper and lower coupling plates 80,82 in order to retain pivot pin 88 in place. Pivot pin 88 also includes respective grease passages (not shown) which allow lubricating grease applied through zerk 94 to lubricate the contact surfaces between pin 88 and plates 80,82 and spacer block 84.

In typical use, coupling assembly 16 is placed intitially in its center aligned position, and hitch member 14 is placed in its retracted position as illustrated in FIGS. 1–4. In these positions, locking pin 46 extends through aperture 56, locking hole 102, body locking aperture 78, lower locking hole 104, and aperture 58. The towing vehicle to which hitch 10 is attached is then manuevered so that the coupling element of the trailer to be coupled is within the predetermined coupling area as defined by the limits of movement of connection end 62 and connector 70.

After the towing vehicle is in position, the user grasps handle 48 and lifts locking pin 46 to free it from body locking aperture 78. While holding the locking pin 46 against the bias of spring 50, the user grasps extension handle 68 and pulls outwardly which extends hitch member 14 to its extended position. This movement also shifts body locking aperture 78 from alignment with upper locking hole 102. FIGS. 5 and 6 illustrate the extended position of hitch member 14 at the extreme range of its extension as defined by stop plate 74 which engages the rearward face of towing vehicle frame 34.

With locking pin 46 extended upwardly from upper locking hole 102 of upper coupling plate 80, the user, while still grasping extension handle 68, can shift hitch member 14 and thereby coupling assembly 16 rightwardly or leftwardly as shown respectively in FIGS. 5 and 6. As illustrated in FIG. 5, coupling asembly 16 pivots about pivot pin 88. The limit of rightward pivotal movement is defined by stop surface 98 which, at the limit, abuts the outboard face of backing plate 18. FIG. 6 illustrates coupling assembly 16 shifted leftwardly from the centerline position to the limit of travel as defined by left shift stop surface 96 which abuts the rearward face of towing vehicle frame 34 to define the leftward limit of travel.

In the preferred embodiment, stop surfaces 96,98 allow respective leftward or rightward shifting of 45 from the center-aligned position. The axial limits of hitch member 14 and the pivotal limits of coupling assembly 16 define the coupling area. Placement of the towing vehicle so that the trailer coupling element lies anywhere within the coupling area allows the trailer to be coupled with the vehicle without any further positioning of the towing vehicle or trailer. The prior art extendable hitches only allow extension of the hitch in an axial direction which inherently requires that the trailer coupling element lie on the line defined by the axial extension of the hitch.

After coupling the trailer with trailer connector 70, another substantial advantage of the present invention becomes apparent because the vehicle operator need only begin driving forwardly. The present invention does not require that hitch member 14 be placed in its retracted position before beginning vehicle operation. Neither is it required that coupling assembly 16 be placed in its aligned position before operating the vehicle. The construction of towing hitch 10 is such that as the towing vehicle begins to move forwardly, the trailer will naturally align with the direction of travel as will hitch member 14 and coupling assembly 16. When this occurs, upper locking hole 102 aligns with locking pin 46 which drops therethrough and abuts the upper surface of hitch body 60 thereby locking coupling assembly 16 in its aligned position. In other words, whenever coupling assembly 16 is shifted to its aligned position, locking pin 46 under the bias of spring 50 automatically locks coupling assembly 16 in its aligned position.

As the towing vehicle moves forwardly, it can continue to tow the trailer with hitch member 14 in the extended position. If the towing vehicle brakes, or reverses direction, hitch member 14 shifts to its retracted which aligns body locking aperture 78 with locking pin 46 which, under the bias of spring 50, drops therethrough, and then through lower locking pin aperture in lower coupling plate 82 to lock hitch member 14 in its retracted position. In this way, and in typical operation, hitch member 14 and coupling assembly 16 automatically return to and lock in their respective retracted and aligned positions so that when the trailer is then uncoupled, further adjustment of towing hitch 10 is unnecessary and the towing vehicle is ready to approach and couple with another trailer.

As those skilled in the art will appreciate, the present invention encompasses many variations in the preferred embodiment herein described. For example, the angle defined by the stop surfaces which define the limits of the arc travel of the coupling assembly could be configured at different angles. Additionally, cams or stop pins could be used to define the limits of travel. As a further example, coupling assembly 16 could be configured for left/right slidable movement rather than the preferred pivotal movement. Such slidable movement, in combination with the axially extendable movement of hitch member 14, would also define a coupling area thereby also enabling rapid and efficient coupling between the towing vehicle and the trailer.

Having thus described the preferred embodiment of the present invention, the following is claimed as new and desired to be secured by Letters Patent.

1. A trailer hitch for coupling a towing vehicle with a trailer, said hitch comprising:

a rigid framework allowing a connection to a towing vehicle;

a hitch member having a connection end adapted for coupling with a trailer;

means operably attaching said hitch member to said framework for allowing selective shifting of said connection end within an area of movement for facilitating trailer coupling, said attachment means including an elongated hitch body secured to said hitch member and presenting a forward end adjacent the hitch member and a spaced, opposed rearward end;

means supporting said hitch body for fore and aft axial shifting thereof between a forwardly shifted extended position and a rearwardly shifted retracted position, and for pivotal movement of the hitch body about a pivot axis, said supporting means comprising a bracket for shiftably receiving said hitch body and permitting said axial shifting thereof between said extended and retracted positions, said bracket presenting spaced, opposed front and rear margins and laterally spaced apart side edges, said supporting means further including means pivotally coupling said bracket to said rigid framework about a pivot axis which is transverse to and laterally offset from said hitch body longitudinal axis and located proximal to one of said side edges of said bracket, said framework including structure defining a bracket-clearing passageway permitting rearward pivoting of said bracket to a point where said hitch body rearward end and portions of said bracket rearward margin and said side edge remote from said pivot axis are positioned rearwardly of the pivot axis.

2. The trailer hitch of claim 1, said framework including an upright rearmost mounting plate, said passageway-defining structure including means presenting an elongated slot through said plate through which said bracket may pivot.

3. The trailer hitch of claim 1, including means releasably locking said bracket in position relative to said framework.

4. The trailer hitch of claim 1, including means for releasably locking said hitch member in said retracted position thereof.

5. The trailer hitch of claim 1, said pivot axis being fixed.

* * * * *